United States Patent [19]

Braidotti et al.

[11] Patent Number: 4,660,712
[45] Date of Patent: Apr. 28, 1987

[54] SEPARATOR DEVICE FOR BARS

[75] Inventors: Archimede Braidotti, Buttrio; Renzo Mini, Pozzuolo Del Friuli; Giancarlo Roseano, Buttrio, all of Italy

[73] Assignee: Danieli & C. Officine Meccaniche SpA, Buttrio, Italy

[21] Appl. No.: 744,327

[22] Filed: Jun. 13, 1985

[30] Foreign Application Priority Data

Jun. 13, 1984 [IT] Italy ................................ 83368 A/84

[51] Int. Cl.$^4$ ...................... B65G 47/14; B65G 47/31; B65G 47/84; G06M 7/00
[52] U.S. Cl. .................................... 198/434; 198/443; 198/503; 414/745
[58] Field of Search ............... 198/503, 431, 459, 461, 198/478.1, 434, 443, 463.5; 414/745, 748

[56] References Cited

U.S. PATENT DOCUMENTS

| | | | |
|---|---|---|---|
| 3,147,842 | 9/1964 | Rambo | 198/463.5 |
| 3,151,747 | 10/1964 | McGoogan | 414/748 |
| 3,195,737 | 7/1965 | Melrose | 414/745 |
| 3,301,383 | 1/1967 | Doyer | 198/824 |
| 3,373,868 | 3/1968 | Missioux et al. | 198/459 |
| 3,410,404 | 11/1968 | Glasson | 198/434 |
| 3,506,108 | 4/1970 | Glasson | 198/503 |
| 3,701,336 | 10/1972 | McConnell et al. | 414/745 |
| 3,724,648 | 4/1973 | Schaller | 198/443 |
| 4,073,978 | 2/1978 | Womack et al. | 414/745 |

FOREIGN PATENT DOCUMENTS

| | | | |
|---|---|---|---|
| 203511 | 10/1983 | German Democratic Rep. | 198/461 |
| 1068542 | 5/1967 | United Kingdom | 198/503 |
| 475330 | 9/1975 | U.S.S.R. | 414/748 |

Primary Examiner—Joseph E. Valenza
Assistant Examiner—Daniel R. Alexander
Attorney, Agent, or Firm—Wegner & Bretschneider

[57] ABSTRACT

Device (10) to separate bars which is suitable for separating elongated elements, such as bars (19), tubes or other like elements, from a bundle in motion along a conveyor (12), the separator device (10) being positioned in cooperation with the conveyor (12) and comprising a series of movable separators (14) arranged along the front of the conveyor (12) and at least one elevator (13) which lifts one end of each bar to deliver it to the separator device.

9 Claims, 5 Drawing Figures

SEPARATOR DEVICE FOR BARS

BACKGROUND OF THE INVENTION

This invention concerns a separator device for bars. To be more exact, this invention concerns a device to separate bars, such as rolled bars, tubes or other like elongated elements, in motion along a conveyor.

Hereinafter the word "bars" shall be used to mean, more broadly, all these types of products.

Various types of devices to separate bars are known. For instance, DE-B-1.235.218 discloses a separator device with rotary panels, such device separating the bars from one another with a progressive action. The panels rotate in a plane substantially parallel to the bars and perform the separation with a wedge-wise action. The progressive nature of the action is due to the fact that the various panels engage a bar momentarily separated from the rest of the bundle, one bar being engaged at a time, starting from one end.

The bars thus separated are delivered in bundles to a conveyor belt.

FR-A-1.407.284 discloses a device to separate bars which is provided with toothed wheels, which are all positioned coaxial to each other on an axis substantially parallel to the lengthwise development of the bars and horizontal in this case. In this way all the toothed wheels engage the bar momentarily engaged, at one and the same time, such bar having of necessity to be positioned already parallel to the axis of rotation of the toothed wheels. There is therefore no progressive separation action. The bars are united at their ends in bundles and sent to a discharge line.

FR-A-2.246.477 discloses a device to distribute bars with engagement of the bars and withdrawal thereof, one at a time, from a store or reserve, by means of an arm provided with reciprocating motion. The bars are sent to a vertical corridor cooperating with star-shaped discharge means.

The present invention has the particular, but not restrictive, purpose of separating the bars after they have been counted by a counter device.

For instance, it is known that in the field of rolled bars such bars are counted by automatic counter means before going forward to be bound in bundles.

The bars are counted, for instance, at one of their ends, and such end actuates counter means of a mechanical, magnetic, electronic or optical type or other equivalent means.

Such bars may be variously entangled or piled up along the conveyor which takes them for the counting operation, and also downstream from the counter means.

SUMMARY OF THE INVENTION

It is therefore best to obtain a separation of such bars so as to simplify and regulate their arrangement for the purpose of forming bundles of a regular number during the successive binding process.

In this way it is possible to facilitate the binding operation and also to provide greater uniformity, ensuring that the bundle thus made contains the pre-set number of bars.

The present applicant has therefore studied and tested a device suitable for the separation of bars running on a conveyor, such separation being obtained, in particular, downstream, or upstream, from a counter device.

In a preferred embodiment the device to count bars according to this invention comprises a plurality of movable elements, such as sprocket wheels or star wheels, or else chain elements.

Such elements are equipped advantageously with means able to engage and draw the bars, such as teeth, ridges, projections, etc. of a suitable geometric configuration.

The arrangement of the drawing means according to this invention is such as to enable the bars to be engaged progressively at the outlet from the counter means.

In this way each single bar, or possibly group of bars, is progressively lifted and disentangled from any bars in contact with it.

At the end the bar thus lifted and separated from the other bars is sent on to a discharge station.

In this way the bars are counted in succession and separated from each other, being lifted and re-positioned on suitable conveyor means for forwarding to the binding or other successive operation.

In a preferred embodiment the separator means consist of coaxial wheels able to rotate about an inclined axis, so that the wheels in such series are positioned at a height which is progressively greater in a direction lengthwise to the bars. The inclination of such axis may perhaps be adjustable.

In an alternative embodiment the axis of the wheels is parallel to the plane of the conveyor.

The reciprocal height of the axis of such wheels and of such conveyor may be adjustable to suit the diameters of the bars and their flexibility and length.

If an inclined axis is provided, an aspect of lead-in and engagement of the bar is obtained according to the invention, the bar being already engaged at the front of the device after being lifted beforehand by suitable elevator means.

An effect is also obtained of refusal or rejection of any other bars in the bundle which may be in contact with the bar temporarily engaged, in correspondence with the last wheels in the series.

Auxiliary means are also provided, such as butting means to align the bars during their lifting and placement.

This invention is therefore embodied with a device to separate bars which is suitable for separating elongated elements, such as bars, tubes or other like elements, from a bundle in motion along a conveyor, such separator device being positioned in cooperation with such conveyor and being characterized by comprising a series of movable separator means arranged along the front of the conveyor and at least one elevator means which lifts one end of the bars arriving.

BRIEF DESCRIPTION OF THE DRAWINGS

We shall describe hereinafter, as a non-restrictive example, a preferred embodiment of this invention with the help of the attached figures, in which.

DETAILED DESCRIPTION

Figure 1:
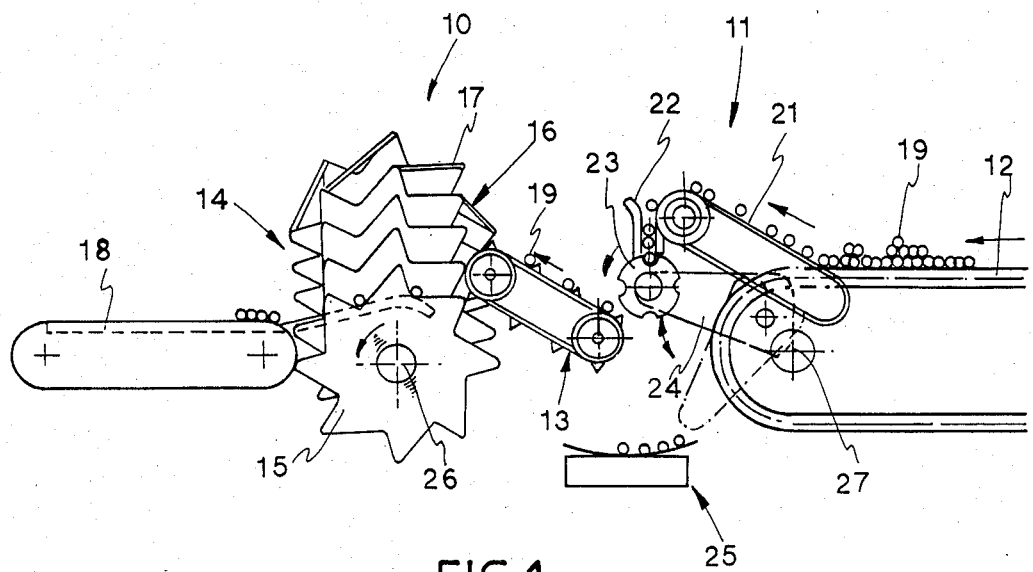
FIG. 1 is a side view of the device of the invention.

In FIG. 1 a device 10 is located downstream from a means 11 to count bars positioned in correspondence with a conveyor 12. Such conveyor 12 can be a belt conveyor or chain conveyor or be of any other required type.

Figure 2:
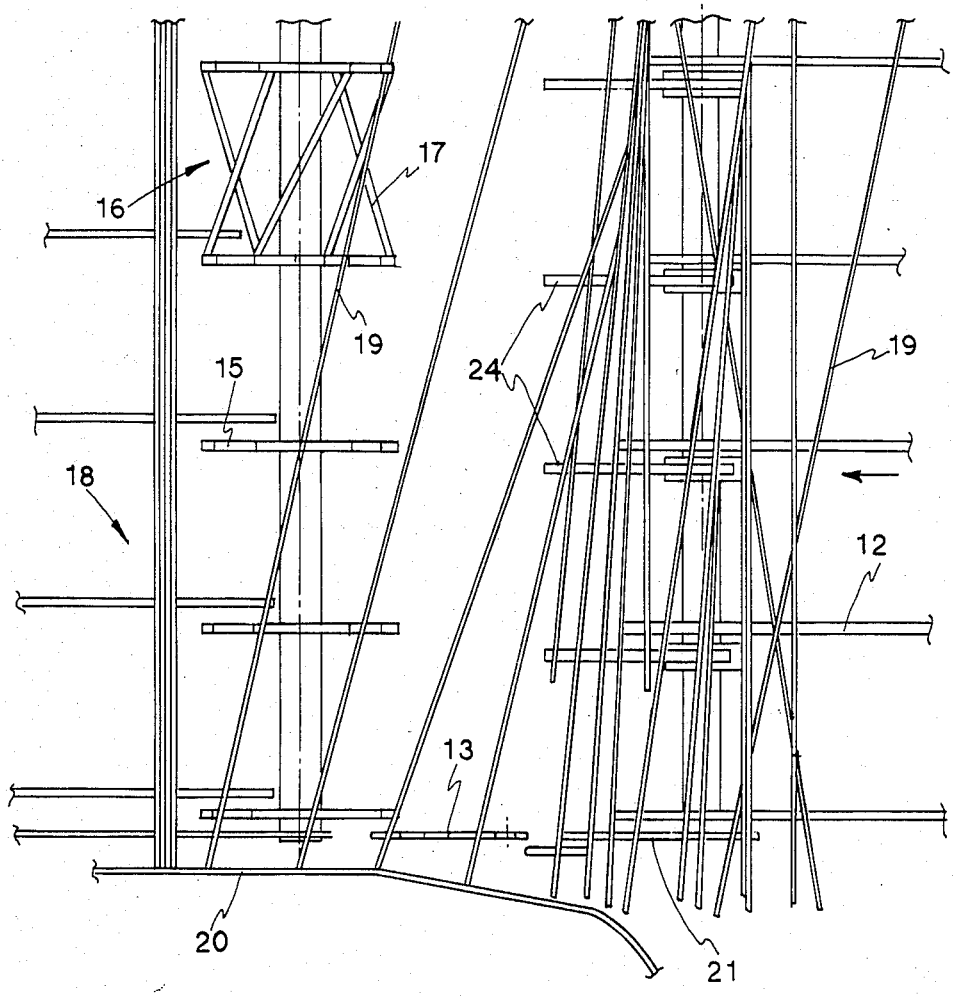
FIG. 2 is a plan view of the device.

Bars 19 run on the conveyor 12 and can be variously piled up, as can be seen in FIG. 2.

The means 11 to count bars which is shown as an example in FIG. 1 comprises an elevator 21 consisting of a chain in this instance; the bars 19 are lifted on this elevator 21 and are then made to drop into a funnel-shaped guide 22. The bars 19 leave the lower end of this guide 22 one by one and are removed in a controlled manner by a notched wheel 23.

During this removal from the funnel-shaped guide 22 the bars 19 are counted by suitable counter means, which are not shown here and are of a known type.

In this case an elevator 13 is positioned immediately downstream from the notched wheel 23 and is a part of the device 10 to separate bars 19.

This elevator 13 is necessary to lift the bars 19 to a height which will enable them to be engaged by teeth of a first wheel 15, as we shall see later.

The elevator 13 consists, in this case, of a chain equipped with suitable means to engage bars, such as pins, teeth or projections however embodied.

The device 10 consists of a plurality of separator means 14. In the example shown such means 14 are formed with star wheels 15 in the initial portion of the device 10 and of basket-shaped wheels 16, which consist of two star wheels connected together at their outer ends with cross pieces, in the end portion of the device 10 corresponding with the tail ends of the bars 19.

In FIG. 2 the heads of the bars 19 are at the lower end of the figure, while the tails are at the upper end.

As we said above, the separator means 14 consist of star wheels 15 comprising a plurality of teeth.

The inclination of the faces of such teeth has been chosen to enable the bars 19 to be easily engaged on the upstream side of the separator means 14 and to be easily discharged downstream from the means 14 without the bars 19 being retained by the teeth.

Figure 4A:
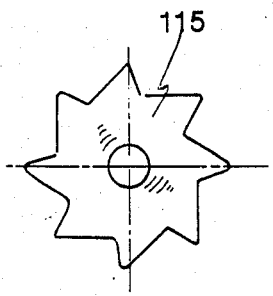
FIGS. 4a and 4b respectively show types of movable elements.
Figure 4B:
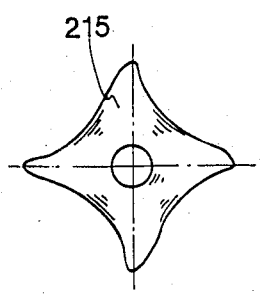

FIGS. 4a and 4b respectively show two types of star wheels; 115 is a star wheel for bars of small dimensions, whereas 215 is a star wheel with a pitch, between the single teeth, double that of the wheel shown before 115. The purpose of this is to enable bars 19 of large diameters (as an example, up to 40 mm. or more) to be engaged.

In fact, the present applicant has found by experiments that in the case of thick bars the employment of star wheels of the type 115 alone is not enough to ensure a secure engagement of bars of large diameters; it is therefore possible to use star wheels 115 alternated with star wheels 215 to obtain a secure engagement and drawing of such bars 19. Any possible rebound of bars of large diameters from the teeth of the star wheels 115 is obviated in this way.

In the example shown there are basket-shaped wheels 16 in the end portion of the device 10; such basket-shaped wheels 16 consist, for instance, of two star wheels 115 of the type shown in FIG. 4a, which are connected together with rods 17 arranged with a helicoidal development as can be seen in FIG. 2.

Such an arrangement has the purpose of facilitating the engagement of the tails of the bars 19 with the latter star wheels 16 and also is intended to repel any bars 19 in the bundle at the outlet of the conveyor 12 which may happen to be near the bar 19 momentarily engaged.

In fact, it has been found that, when a bar 19 is lifted by the separator means 14, it tends to draw with it any tails of bars 19 entangled with it.

The presence of the helicoidal rods 17 which are a part of the basket-shaped wheels 16 causes such undesired tails of bars to be thrust backwards and only the bar 19 momentarily selected to remain engaged by the means 14.

The invention provides for the ability to adjust the height and/or inclination of the whole device 10 in relation to the plane of the conveyor 12 which feeds bars, depending on the speed of withdrawal and also on the variations in diameters, weights, flexibility and length of the bars to be selected.

When the bar 19 momentarily selected has been separated by the separator means 14, it is placed on discharge means 18, which may consist, for instance, of a chain conveyor or roller conveyor or conveyor of another known type. From here the bars 19 are sent to successive usage means.

In particular, cooperation between the separator device 10 and counter device 11 is advantageous in the preparation of bundles of bars 19; in fact, it is possible to halt both the counter device 11 and separator device 10 when a pre-set number of bars 19 has been reached. In this way the bundles are made up with a controlled number of bars.

It is possible to arrive at the weight of a bundle from the weight of a bar without any need to perform weighing, thus eliminating one operation.

FIG. 2 shows a guide or butting means 20; butting means can be provided at the tail or head of bars 19. In the example shown the butting means 20 consists of a metal sheet able to vibrate and position the head of the bar 19.

In any event it is advantageous to perform a butting operation at the tail of the bar 19, for in this way the bars which are shorter than usual are also butted but are not counted.

The invention provides for separate collection of such short bars, which are not counted by the counter device 11 but are momentarily supported, instead, by means 24 to retain short bars; such means 24 are, for instance, constituted by supports which can be overturned and are shown in the plan view of FIG. 2.

These means 24 support the short bars leaving the conveyor 12 and discharge them onto a conveyor 25 for short bars, which may, for example, consist of a roller conveyor or belt conveyor. In this way the short bars are eliminated separately from the normal bars 19.

Figure 3:
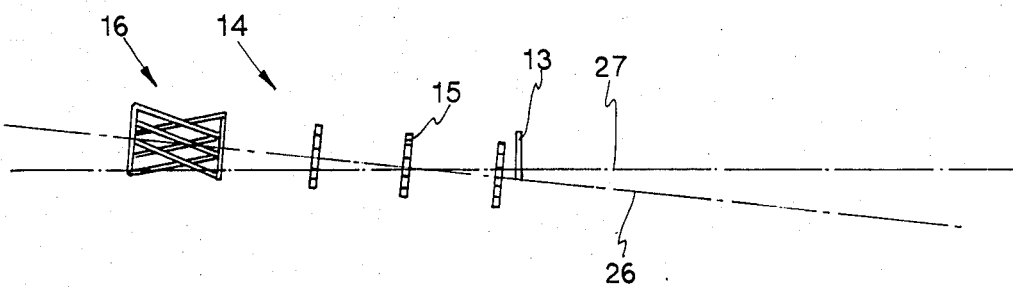
FIG. 3 is a frontal diagram of the device showing the inclination of the axis of the movable elements.

FIG. 3 gives a front view of the device 10 and shows the inclination applied to the axis 26 of the separator means 14 as compared to the axis 27 of the conveyor that feeds the bars 19 in this preferred embodiment.

In this way, since the separator means 14 corresponding to the heads of the bars 19 are at a lower height, it is possible for the heads of the bars 19 to be engaged by the first of such means 14.

Then, by a progressive drawing action, the bar 19 is engaged by the next means 14 until the bar 19 momentarily engaged has been lifted and fully separated.

FIG. 3 shows also the elevator means 13 which cooperate with the first star wheel 15.

In an alternative embodiment, which is not shown here, the separator means 14 can consist of a plurality of chains equipped with suitable means to engage bars 19, such as teeth, pins or other like means.

Such chains can have their ascending branch, which has to draw the bars 19, with an inclination variable along the axis 26 and can also be arranged with progressively differentiated heights.

We have described here some preferred embodiments of this invention, but further embodiments are possible for a person skilled in this field without departing thereby from the scope of the invention.

INDEX

- 10: separator device
- 11: means to count bars
- 12: conveyor
- 13: elevator
- 14: separator means
- 15: star wheels
- 115: wheel with normal pitch
- 215: wheel with double pitch
- 16: basket-shaped wheels
- 17: rods
- 18: discharge means
- 19: bars
- 20: butting means
- 21: elevator
- 22: guide
- 23: notched wheel
- 24: means to retain short bars
- 25: conveyor for short bars
- 26: axis of separator means
- 27: axis of conveyor.

We claim:

1. Apparatus for separating individual elongated elements from a group of elongated elements carried along a conveyor and disposed generally transversely to the carrying direction, comprising:
    a separator means comprising an axis having upper and lower ends, inclined with respect to the plane of the conveyor and disposed transversely to the carrying direction, and first and second element accepting means on the axis, said first element accepting means being lower than said second element accepting means;
    elevator means for delivering one end of an elongated element to the first element accepting means, said first element accepting means engaging the one end of the element before the second element accepting means engages the element.

2. Apparatus as claimed in claim 1, wherein the element accepting means are star wheels.

3. Apparatus as claimed in claim 2, wherein star wheels of differing configurations are present.

4. Apparatus as claimed in claim 1, further comprising a basket wheel mounted on said axis, said basket wheel comprising two adjacent star wheels, the points of which are joined by rods, said basket wheel being configured for rejecting elongated elements other than that delivered by the elevator means to the first element accepting means, said second element accepting means being located between said basket wheel and said first element accepting means.

5. Apparatus as claimed in claim 1, wherein the elevator means comprises a chain provided with means for engaging elongated elements.

6. Apparatus as claimed in claim 1, further comprising means to butt an end of an elongated element.

7. Apparatus as claimed in claim 1, further comprising means for counting elongated elements.

8. Apparatus as claimed in claim 1, wherein said separator means further comprises discharge means for accepting elements from the separator means.

9. Apparatus for separating individual elongated elements from a group of elongated elements carried along a conveyor and disposed generally transversely to the carrying direction, comprising:
    a separator means comprising an axis disposed transversely to the carrying direction, first and second element accepting means and a basket wheel, said second element accepting means being disposed between said first element accepting means and said basket wheel;
    elevator means for delivering one end of an elongated element to the first element accepting means, said first element accepting means engaging the one end of the element before the second element accepting means engages the element;
    said basket wheel comprising two adjacent star wheels, the points of which are joined by rods, said basket wheel being configured to reject elongated elements other than that delivered to the first element accepting means.

* * * * *